UNITED STATES PATENT OFFICE.

GEORGE W. POWELL, OF HALIFAX COUNTY, VIRGINIA.

IMPROVEMENT IN COMPOSITIONS FOR DESTROYING INSECTS.

Specification forming part of Letters Patent No. 175,749, dated April 4, 1876; application filed July 14, 1875.

*To all whom it may concern:*

Be it known that I, GEORGE W. POWELL, of the county of Halifax and State of Virginia, (P. O., Meadsville,) have invented a new and useful Compound for Destroying Insects, which compound is fully described in the following specification:

This invention relates to that class of compounds used for the destruction of insects of every kind, but more especially those that have proved so destructive to plants, crops, &c., such as the tobacco-fly, grasshopper, chinch-bug, &c.

To prepare my composition, take one quart of fine, dry, well-sifted wood-ashes. Add a half pint of kerosene-oil, and mix well together, and the preparation is ready to be used by sprinkling or scattering the same lightly over the plants or crops attacked by insects, and will drive off or destroy the insect without injuring such plants or crops.

I claim—

A compound consisting of common wood-ashes and kerosene-oil, substantially as and for the purpose specified.

G. W. POWELL.

Witnesses:
    JAMES D. CLAY,
    JAMES E. GRUBBS.